United States Patent
Chang et al.

(10) Patent No.: US 12,282,615 B2
(45) Date of Patent: Apr. 22, 2025

(54) PASSIVE CAPACTIVE STYLUS AND ERASER CAP

(71) Applicant: EGALAX_EMPIA TECHNOLOGY INC., Taipei (TW)

(72) Inventors: Chin-Fu Chang, Taipei (TW); Shang-Tai Yeh, Taipei (TW); Hsueh-Fen Lin, Taipei (TW); Yu-Cing Lien, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/541,394

(22) Filed: Dec. 15, 2023

(65) Prior Publication Data
US 2025/0013321 A1   Jan. 9, 2025

(30) Foreign Application Priority Data
Jul. 3, 2023   (TW) ................ 112124804

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01); *G06F 3/0445* (2019.05); *G06F 3/0446* (2019.05)

(58) Field of Classification Search
CPC .... G06F 3/03545; G06F 3/044; G06F 3/0445; G06F 3/0446

USPC ........................................................ 345/179
See application file for complete search history.

(56) References Cited

U.S. PATENT DOCUMENTS

| | | | |
|---|---|---|---|
| 10,234,963 B2 | 3/2019 | Xiao et al. | |
| 10,564,737 B2 | 2/2020 | Yeh et al. | |
| 2013/0100088 A1* | 4/2013 | Mao | G06F 3/03545 |
| | | | 345/179 |
| 2016/0320868 A1* | 11/2016 | Chang | G06F 3/0442 |
| 2019/0056806 A1* | 2/2019 | Yeh | G06F 3/0383 |
| 2019/0179434 A1* | 6/2019 | Tanaka | G06F 3/046 |
| 2022/0137730 A1* | 5/2022 | Wu | G06F 3/044 |
| | | | 345/179 |

FOREIGN PATENT DOCUMENTS

| | | |
|---|---|---|
| CN | 105975105 | 9/2016 |
| TW | 201913306 | 4/2019 |
| TW | 201915672 | 4/2019 |

* cited by examiner

*Primary Examiner* — Tom V Sheng
(74) *Attorney, Agent, or Firm* — WPAT, PC

(57) ABSTRACT

A passive capacitive stylus, comprising: a body, made of non-conductive material, comprises an internal space; a conductor, disposed inside the internal space, comprises conductive foam; a first head made of conductive material and disposed inside the first open and being protruded outside the body in a first direction of the central axis, the first head is in contact with the conductor; and a second head made of conductive material and disposed inside the second open and being protruded outside the body in a second direction of the central axis, the second head is in contact with the conductor.

12 Claims, 11 Drawing Sheets

PASSIVE CAPACITIVE STYLUS AND ERASER CAP

CROSS REFERENCE TO RELATED PATENT APPLICATION

This patent application is based on a Taiwan, R.O.C. patent application No. 112124804 filed on Jul. 3, 2023.

FIELD OF THE INVENTION

The present invention relates to capacitive stylus, and more particularly, to passive capacitive stylus which does not emit electromagnetic wave actively.

BACKGROUND OF THE INVENTION

Capacitive touch screen or panel is one of major input devices of modern consumer electronics. In addition to input by fingers, the input may be done by passive capacitive stylus which does not emit electromagnetic waves actively. Since there is no battery and active electric components, passive capacitive stylus is cheap.

However, there is only one tip of passive capacitive stylus for input. If a user is intended to erase on the touch screen or panel, another electronic board eraser is required. Or the user must switch from an input mode into an eraser mode in the application program before using the tip to perform erasing. Besides, after being switched into the eraser mode, the area size touched by the tip is quite limited. The user must enlarge its corresponding erasing area to quickly cover all portions he wants to erase. No matter using the electronic board or switching the mode, it is inconvenient to the user.

Consequently, it is required to have a passive capacitive stylus for improving user experience to provide inputting or erasing by user without additional switch steps. For example, input accuracy can be increased; and the erasing area can be expanded. Moreover, manufacture costs can be reduced. The lightweight design can be more drop resistant.

SUMMARY OF THE INVENTION

According to one embodiment of the present application, a passive capacitive stylus is provided. The stylus comprising: a body, made of non-conductive material, comprises an internal space, wherein two ends of the body comprises a first open and a second open, respectively, a longest first line inside the first open perpendicular to a central axis of the body is shorter than a longest space line inside the internal space perpendicular to the central axis, a longest second line inside the second open perpendicular to the central axis of the body is shorter than the longest space line; a conductor, disposed inside the internal space, comprises conductive foam; a first head made of conductive material and disposed inside the first open and being protruded outside the body in a first direction of the central axis, the first head is in contact with the conductor; and a second head made of conductive material and disposed inside the second open and being protruded outside the body in a second direction of the central axis, the second head is in contact with the conductor.

In order to make the touch sensitive processing apparatus easier to tell which ends of the stylus is in contact with the touch screen or panel, the capacitive stylus further comprises an eraser cap which encapsulates and connects to the second head protruded outside the body, the eraser cap comprises conductive material, and the eraser cap is electrically coupled with the second head.

In order to fix the eraser cap to the body more solid, the eraser cap further comprises a third head made of conductive material and configured to encapsulate and connect to the second head protruded outside the body; and one or more third head fastening elements configured to fix the third head to the body.

In order to let the user have a larger contact area to erase, one longest eraser cap line of the eraser cap perpendicular to the central axis is larger than one longest body line of the body perpendicular to the central axis.

In order to reduce the weight of the stylus, especially to reduce the volume of the conductor, the conductor further comprises a packing form for encapsulating the conductive foam so as that the portion of the conductor inside the internal space is not in contact with the body.

In order to let the conductor installed inside the body and steadily connected to the first and the second heads, the conductor occupies a portion of the first open and a portion of the second open, the conductive foam encapsulates a part of the first head and a part of the second head.

In order to reduce number of parts, to simplify manufacture process, and to enhance the electrically coupling, the stylus is further configured as one of following: the conductor, the first head, and the second head are made in a uniform; the conductor and the first head are made in a uniform; and the conductor and the second head are made in a uniform.

In order to fix the slender first head inside the first open, wherein the first line is shorter than the second line, there exists one or more fastening elements inside the first open for fixing the first head inside the first open.

In order to increase the users' different experiences on two ends of the stylus, the hardness of the first head is larger than the hardness of the second head, the flexibility of the second head is larger than the flexibility of the first head, the hardness of the conductive foam is smaller than those of the first and the second heads.

According to an embodiment of the present application, the eraser cap is provided.

According to an embodiment of the present application, an eraser cap for connecting with a passive capacitive stylus is provided. The capacitive stylus further comprises a body, a first head, and a conductor, wherein the body, made of non-conductive material, comprises an internal space, wherein two ends of the body comprises a first open and a second open, respectively, wherein the conductor, disposed inside the internal space, comprises conductive foam, wherein the first head made of conductive material and disposed inside the first open and being protruded outside the body in a first direction of a central axis of the body, the first head is in contact with the conductor, wherein the second head made of conductive material and disposed inside the second open and being protruded outside the body in a second direction of the central axis, the second head is in contact with the conductor, wherein the eraser cap encapsulates and connects to the second head protruded outside the body, the eraser cap comprises conductive material, and the eraser cap is electrically coupled with the second head.

Preferably, in order to fix the eraser cap to the body more solid, the eraser cap further comprises: a third head made of conductive material and configured to encapsulate and connect to the second head protruded outside the body; and one or more third head fastening elements configured to fix the third head to the body.

Preferably, in order to let the user have a larger contact area to erase, one longest eraser cap line of the eraser cap perpendicular to the central axis is larger than one longest body line of the body perpendicular to the central axis.

According to the passive capacitive stylus provided by the present application, it can improve users' experience. It is not required to have additional switch procedures to provide input and erase functions to users conveniently. For example, the input accuracy can be increased, the erasing area can be enlarged. Moreover, the manufacture cost and the weight can be decreased. And it has better fall protection.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
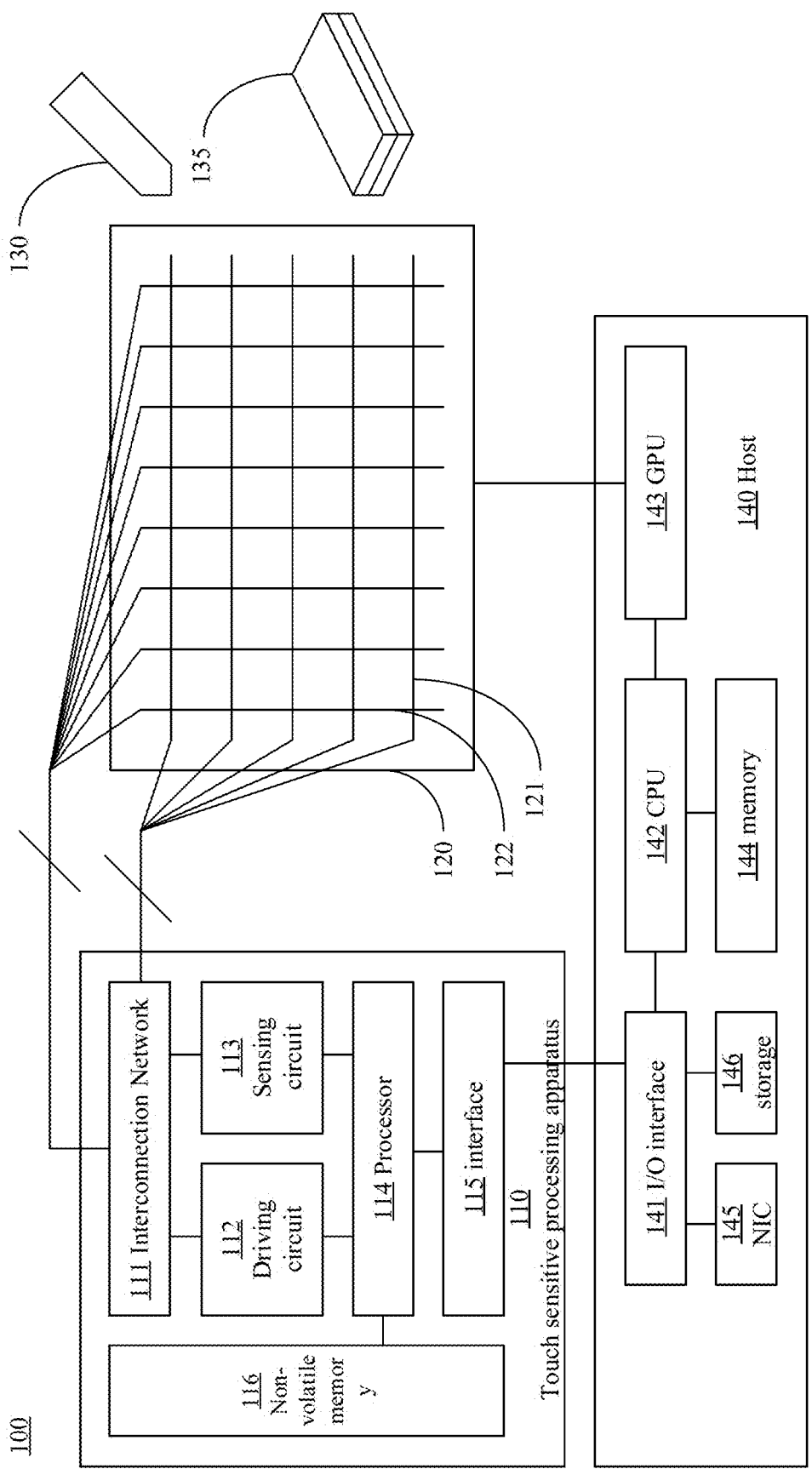
FIG. 1 is a block diagram of a touch system 100 according to an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

The terms "first", "second", "third" and etc. recited in the specification, claims and drawings of the instant application are used to distinguish similar objects, not to specify a sequence or an order. It may be understood that the objects being described in that manner can be interchangeable under appropriate circumstances. In the specification of the instant application, the meaning of "a plurality" explicitly refers to two or more, unless they are specifically defined. In addition, the terms "comprise" and "include" and any other equivalents of these terms are intended to be non-exclusively. Some blocks as shown in the drawings may be functional entities, which may not directly correspond to physical or logical entities. The function entities may be implemented in a form of software, in one or more hardware circuits or integrated circuits, or in different networks, different processor devices or different micro controllers.

In the description of the instant application, it is noted that the terms "installed", "coupled" and "connecting" should be interpreted in the broadest reasonable way, unless they are otherwise defined or limited explicitly. For examples, two may be fixed connected, attachable connected, or jointly connected; mechanically connected, electrically coupled, or communicably connected; directly connected or indirectly connected via intermediates; or interconnected inside the two components or interactively correspondence of the two components. For persons having ordinary skill in the art, he/she can understand what the terms mean substantially in the specification based on the circumstances.

In order to make the purpose, features and advantages of the present application more obvious and easier to understand, below in conjunction with the figures and the specific embodiments are described in further detail to the present application.

Please refer to FIG. 1, which depicts a block diagram of a touch system 100 in accordance with an embodiment of the present application. The touch sensitive system 100 may be a common desktop, laptop, tablet personal computer, industrial control computer, smartphone or any other computer system fulfilling touch sensitive functions.

The touch system 100 may comprise a touch sensitive processing apparatus 110, a touch panel or screen 120 which connects to the touch sensitive processing apparatus 110, and a host 140 which connects to the pressure sensitive processing apparatus 110. The touch system 100 may further comprise one or more styli 130 and/or one or more touch board erasers 135. Hereinafter the present application, the touch panel or screen 120 may be referred as touch screen 120. However, in the embodiments which are lack of display functionality, person having ordinary skill in the art can understand the so-called touch screen is a touch panel per se.

The touch screen 120 comprises multiple first electrodes 121 in parallel to a first axis and multiple second electrodes 122 in parallel to a second axis. The first electrodes 121 intersect with the second electrodes 122 to form multiple sensing points or areas. Similarly, the second electrodes 122 intersect with the first electrodes 122 to form multiple sensing points or areas. In some embodiments, the first electrodes 121 may be referred to as first touch electrodes 121; the second electrodes 122 may be referred to as second touch electrodes 122. Collectively, the first electrodes 121 and the second electrodes 122 are referred to as touch electrodes. In some embodiments involving the touch screen 120, the first electrodes 121 and the second electrodes 122 are made of transparent materials. The first electrodes 121 and the second electrodes 122 may be in the same electrode layer where conductive plates of each of the first electrodes 121 or the second electrodes 122 are connected by bridging. The first electrodes 121 and the second electrodes 122 may be disposed in two overlapping electrode layers. Unless described specifically, the present application may be applicable to the embodiments include single electrode layer and the embodiments include multiple electrode layers. The first axis and the second axis are usually perpendicular to each other. However, the present application does not limit that the first axis must be perpendicular to the second axis. In one embodiment, the first axis may be a horizontal axis or a refresh axis of the touch screen 120. The first electrodes 121 and/or the second electrodes 122 may include multiple conductive plates. Person having ordinary skill in the art may refer to multiple patent applications of the Applicant to understand various embodiments of the first electrodes 121 and/or the second electrodes 122.

The touch sensitive processing apparatus 110 may comprise following hardware circuit modules: an interconnection network module 111, a driving circuit module 112, a sensing circuit module 113, a processor module 714, an interface module 115 and non-volatile memory 116. The touch sensitive processing apparatus 110 may be implemented in a single chip of integrated circuits, which may encapsulate one or more dies. The touch sensitive processing apparatus 110 may be implemented by multiple chips of integrated circuits and a circuit board connecting these chips. The touch sensitive processing apparatus 110 may be implemented in the same chip which comprise the host 140. In other words, the application does not limit how the touch sensitive processing apparatus 110 implements.

The interconnection network module 111 is configured to connect one or more first electrodes 121 and/or the second electrodes 122 of the touch screen 120, respectively. The interconnection network module 111 may receive control commands of the processor module 114 for connecting the driving circuit module 112 with any one or more touch electrodes and for connecting the sensing circuit module 113 with any one or more touch electrodes. The interconnection network module 111 may comprise a combination of one or more multiplexers to fulfill the mentioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves, or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 113 may demodulate the induced touch signal by another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. At the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories, and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the pressure sensitive processing apparatus 110. For examples, the processor module 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The non-volatile memory 116 may include readable and writable memory such as EEPROM or flash memory. Content in the memory can be preserved when power is lost. The processor module 114 can load and execute firmware stored in the non-volatile memory 116 for realizing touch sensitive functionalities. The firmware may include a real-time operating system, instructions, and program for the operations of the processor module 114. In one embodiment, the program and data in the firmware enables the touch sensitive processing apparatus 110 to implement the embodiments provided by the present application.

The touch system 100 may include one or more styli 130 and/or touch board erasers 135. The stylus or the touch board eraser 135 may be a transmitter which emits electrical signals. It may be a transmitter which actively emits electrical signals or a passive transmitter which passively emits electrical signals, or a responsive transmitter which transmits electrical signals in response to external electrical signals. The stylus 130 or touch board eraser 135 may include one or more electrodes for synchronously or asynchronously receiving electrical signals from the touch screen 120 or for synchronously or asynchronously transmitting electrical signals to the touch screen 120. The electrical signals may be modulated in one or more the modulations provided above.

The stylus 130 or the touch board eraser 135 may include a conductor which is supposed to transmit driving signals to ground via a user's hand or body. The stylus 130 or the touch board eraser 135 may connect to the input/output interface module 141 or other modules connected to the input/output interface module 141 wirelessly or by wire.

The touch sensitive processing apparatus 110 can detect one or more external conductive objects such as human fingers, palms, passive styli 130 or touch board erasers 135 via the touch screen 120. It can also detect a stylus 130 or a touch board eraser 135 which transmits electric signals. The touch sensitive processing apparatus 110 can use mutual-capacitance or self-capacitance principles to detect the external conductive objects. The touch stylus 130, the touch board eraser 135 and the touch sensitive processing apparatus 110 can utilize the electrical signals to carry messages by taking advantage of the signal modulations and demodulations. The touch sensitive processing apparatus 110 can detect one or more approaching or touching positions of the stylus 130 or the touch board eraser 135 on the touch screen 120, status of sensors (e.g., pressure sensor or button) onboard the stylus 130 or the touch board eraser 135, a direction of the stylus 130 or the touch board eraser 135, or a tilt angle between the surface of the touch screen 120 and the stylus 130 or the touch board eraser 135 by the electrical signals from the stylus 130 or the touch board eraser 135.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store a normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

In the mutual-capacitance sensing, the driving circuit module 112 provides driving signals to one of the first electrodes 121 in a time-sharing manner. While the driving signals being provided in multiple occasions, the sensing circuit module 113 is required to perform multiple sensing on all the second electrodes 122 simultaneously in order to gather sensing information in multiple one-dimensional sensing arrays. Each of the one-dimensional sensing arrays comprises sensing results corresponding to each of the second electrodes 122. The multiple one-dimensional sensing arrays can form a two-dimensional array of sensing information or a sensing image according to a sequence of the first electrodes 121 which emitted the driving signals. According to the two-dimensional array of sensing information or the sensing image, the processor module 114 can detect whether there is an external conductive object approaching or touching the touch screen 120.

For example, passive capacitive styli 130 and touch board erasers 135 can be detected according to the mutual-capacitance sensing. In some embodiments, the passive capacitive touch board eraser 135 may comprise three or more electrodes on an erasing surface. The touch sensitive processing apparatus 110 can detect these electrodes and determine a position of the erasing surface based on a shape formed by touch positions corresponding to the electrodes. Thus, the host 140 can perform erase procedure accordingly.

In one embodiment, the operating system or the application program executed by the CPU 142 of the host 140 can update the display content corresponding to the positions of the erasing surface reported by the touch sensitive processing apparatus 110. For example, the corresponding display content may be updated to a configured background color, e.g., white color.

When a user tries to use the stylus 130 to erase, he may use the stylus 130 to click a button for switching from an input mode to an eraser mode at first, or he may use other input devices such as mouse or keyboard to switch from the input mode to the eraser mode. The operating system or application program executed by the CPU 142 of the host 140 can update the display content corresponding to the position of the tip of the stylus 130 reported by the touch sensitive processing apparatus 110. For example, the corresponding display content may be updated to a configured background color, e.g., white color.

In reverse, when it is desired to switch back to the input mode from the eraser mode, the user may use the stylus 130 to click a button for switching from the eraser mode to the input mode at first, or he may use other input devices such as mouse or keyboard to switch from the eraser mode to the input mode. The operating system or application program executed by the CPU 142 of the host 140 can update the display content corresponding to the position of the tip of the stylus 130 reported by the touch sensitive processing apparatus 110. For example, the corresponding display content may be updated to a configured foreground color, e.g., black color.

Because the area size of display content corresponding to the tip of the stylus 130 is quite limited, when it is desired to erase larger display content, the user has to use the stylus 130 or other input devices to enlarge the corresponding area of display content. Reversely, when it is desired to input in a smaller area, the user has to use the stylus 130 or other input devices to shrink the area of display content. In other words, in addition to switch the mode, the user has to adjust the area size of display content which is corresponding to the stylus 130 back and forth. Thus, it is very inconvenient for the user to use the stylus 130. Hence, the present application provides a kind of stylus 130 having two ends for input and for erase functions, respectively.

A stylus 130 according to one embodiment of the present application is roughly a cylinder which comprises a body for the user to hold the stylus 130. For example, the body may be a polygon prism with a N-edge polygon as a base, where N is an integer larger than or equal to 3. In some embodiment, the N-edge polygon is a regular polygon. In order to reduce the weight of the stylus 130, the body can be made of dielectric material.

There is a hollow space inside the stylus 130 in order to contain conductive material. The internal conductive material and a hand holding the stylus 130 can form a capacitor so as the electric charges of the driving signals emitted from the touch screen or panel 120 can be directed to the ground via the hand. Therefore, the touch sensitive processing apparatus 110 is able to detect changes of electric charges such that a position of the stylus 130 with respect to the touch screen or panel 120 can be derived accordingly.

The internal space may be a cylinder, or the internal space may be a polygon prism or a regular polygon prism with a M-edge polygon as a base, where M is an integer larger than or equal to 3. M may be identical to N. When M equals to N, the shape of the internal space is corresponding to the shape of the body. In one embodiment, a long central axis of the space and a long central axis of the body are in the same line. In an alternative embodiment, the long central axis of the space and the long central axis of the body are not aligned in the same line.

Figure 2:
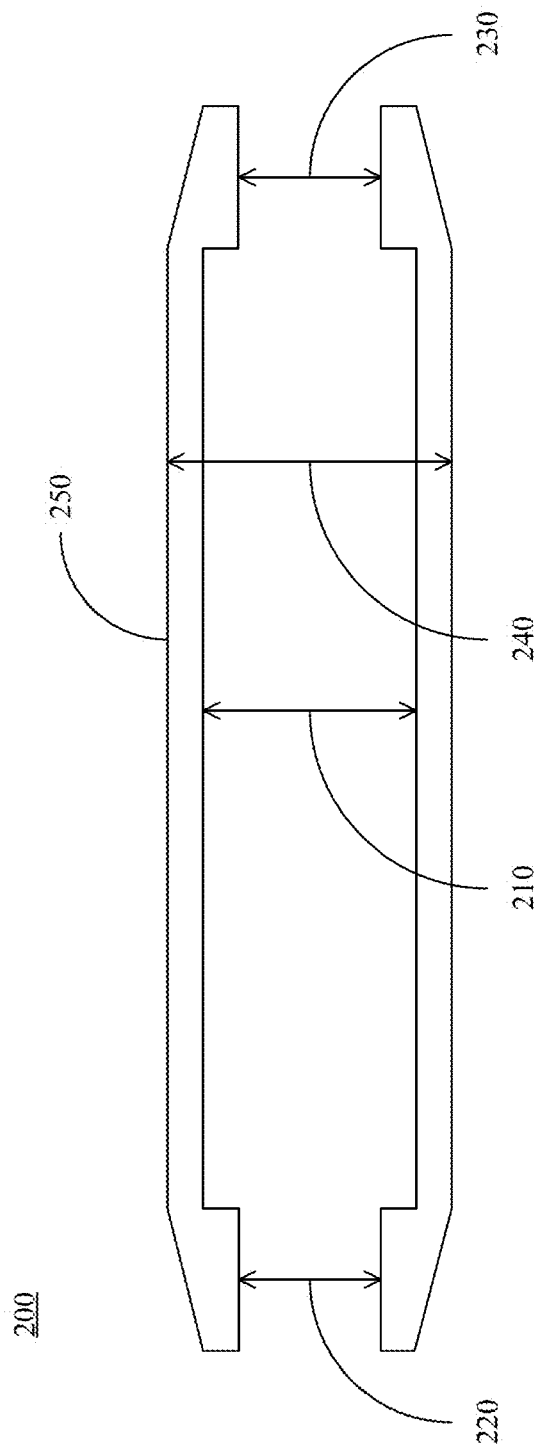
FIG. 2 shows a cross sectional view of a stylus body 200 according to an embodiment of the present application.

Please refer to FIG. 2, which shows a cross sectional view of a body 200 in accordance with an embodiment of the present application. The cross-sectional plane passes through the long central axis of the body 200. As show in FIG. 2, the body 200 may be an axis-symmetric shape. The axis of symmetry is aligned with the long central axis of the body 200. The body may be a plane-symmetric shape. The plane of symmetry may be the cross-sectional plane of the body 200 as shown in FIG. 2.

The user's hand is supposed to hold a middle part 250 of the body 200. The material of the body 200 may be one or any combination of following dielectric material: plastic, glass fiber, wood, bamboo etc. The present application does not limit that the material of the body 200 is identical or isomorphic. The body 200 may be made of a single part or of a combination of parts. Different materials of parts may lead to different methods of assembly. The present application does not limit the number of parts and the methods of assembly of the body 200.

Two ends of the long central axis of the body 200 are two opens. A shape of a cross sectional plane of the first open in the left and a shape of a cross sectional plane of the second open in the right may be circular, polygonal, or regular polygonal, respectively. The present application does not limit that the shapes of the first and the second opens are identical. Centers of the shapes of the first and the second opens may be at the long central axis of the body 200. The shapes may be perpendicular to the cross-sectional plane of the body 200 as shown in FIG. 2. As shown in FIG. 2, a diameter or a longest line 220 passing the center of the cross-sectional plane of the first open may equals to a diameter or a longest line 230 passing the center of the cross-sectional plane of the second open. However, in an alternative embodiment, because the first open is required to house a first end or a tip end and the second open is required to house a second end or an eraser end, the line 220 may be shorter than the line 230. In order to conveniently install the tip and the eraser ends, the line 220 may be shorter than a diameter or a longest line 240 passing the center of the perpendicular cross-sectional plane of the body 200. The line 220 may be shorter than the line 240.

In order to reduce the weight of the stylus 130, a diameter or a longest line 210 passing the center of the perpendicular cross-sectional plane of the space may be longer than the line 220 or may be longer than the line 230. In one embodiment, for convenience of manufacture or design, lengths of the lines 210, 220 and 230 may be identical.

Figure 3:
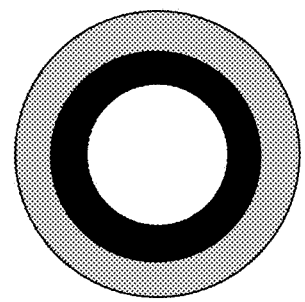
FIG. 3 shows a diagram of a stylus body 200 according to an embodiment of the present application.

Please refer to FIG. 3, which illustrates a diagram of a body 200 in accordance with an embodiment of the present application. The view of the body 200 as shown in FIG. 3 is from the left side or the right side of FIG. 2. In the middle of the body 200 is an internal space. It can see through the second open from the first open.

Figure 4:
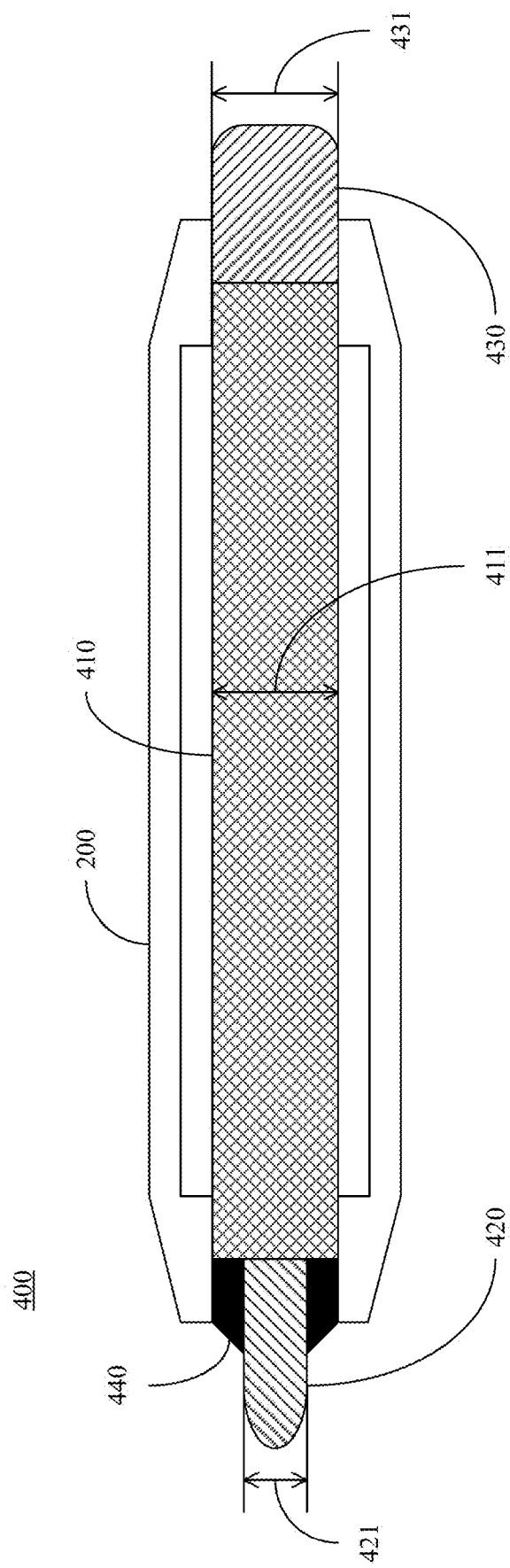
FIG. 4 illustrates a cross sectional view of a stylus 400 according to an embodiment of the present application.

Please refer to FIG. 4, which illustrates a cross-sectional view of a stylus 400 in accordance with an embodiment of the present application. In addition to the body 200, the stylus 400 may comprise a conductor 410 disposed inside the internal space of the body 200, a first head 420 in the first open, and a second head 430 in the second open. The first head 420 and the second head 430 may be made of conductive materials which are electrically coupled to the conductor 410, respectively. The conductor 410, the first head 420, and the second head 430 may comprise conductive foam or conductive fiber or may be made of man-made fibers or cotton fibers which are being soaked in conductive solution. The conductive solution may comprise particles of carbon, nano-silver or any other suitable metal or conductive materials. In one embodiment, the conductor 410 may comprise a packing form for encapsulating the conductive foam, conductive fibers, man-made fibers and/or cotton fibers such that the conductor 410 inside the space is not in contact with the body 200. In the embodiment, the packing form may be a hollow tube such as a straw. However, the present application does not limit that the cross-sectional shape of the packing form is a circle.

Although the coupling interface between the conductor 410 and the first head 420 is a plane as shown in FIG. 4, the present application does not limit to that. For example, in case that the conductor 410 includes conductive foam, the first head 420 can be plugged into the interior of the conductor 410 such that a part of the first head 420 is embraced by the conductive foam in order to increase area of the contact surface between them. Similarly, the second head 430 can be plugged into the interior of the conductor 410 such that a part of the second head 430 is embraced by the conductive foam in order to increase area of the contact surface between them. In an embodiment, the contact surface between the second head 430 and the conductor 410 may be like waves or irregular shapes so as the area of the contact surface can be enlarged.

A diameter or a longest line 411 passing through the center of the perpendicular cross-section of the conductor 410 may be shorter than the line 210. Naturally, the line 411 is shorter than the line 240. Because most of the user's hand holds the body, a body capacitor is formed between the hand and the conductor 410. A tip capacitor is formed between the first head 420 and the touch screen or panel 120. Because the first head 420 is electrically coupling to the conductor 410, the tip capacitor and the body capacitor are connected in series. Since the body capacitor is larger than the tip capacitor, it makes little influence on the tip capacitor. It would not affect the detection accuracy of the touch sensitive processing apparatus 110 on the position where the first head 420 approaches or touches the touch screen or panel 120. Similarly, when another head capacitor is formed between the second head 430 and the touch screen or panel 120, it would not affect the detection accuracy of the touch sensitive processing apparatus 110 on the position where the second head 430 approaches or touches the touch screen or panel 120.

Moreover, the body 200 is made of dielectric material, it does almost nothing to the detection of the touch sensitive processing apparatus 110. Hence, the stylus 400 provided by the present application may improve the detection accuracy of the touch sensitive processing apparatus 110 on the position of the first head 420 or the second head 430.

The first head 420 may be used as the tip end for input. It may be required to be formed as a hard and slender shape in order to improve the detection accuracy of the touch sensitive processing apparatus 110 on the position of the first head 420. The second head 430 may be served as an eraser end. It may be required to be chucky in order to enlarge an area size of a contact surface of the second head 430 detected by the touch sensitive processing apparatus 110. Thus, the corresponding erasing area can be expanded accordingly. In other words, a diameter or a longest line 421 passing the center of the perpendicular cross-section of the first head 420 may be less than a diameter or a longest line 431 passing the center of the perpendicular cross-section of the second head 430.

Because the line 421 may be shorter than the line 411, one or more fastening elements 440 may be disposed in between the first head 420 and the body 200 to fix the first head 420. The one or more fastening elements 440 may be made of conductive material or non-conductive material. Although there is no fastening element in between the second head 430 and the body 200 as shown in FIG. 4, it may include one or more fastening elements to fix the second head 430 in one embodiment.

The first head 420 and the second head 430 may be wear and teared, the first head 420 and the second head 430 may be replaceable. In one embodiment, in order to improve the user experience, the conductor 410, the first head 420, and the second head 430 may consist of different kinds of materials. For example, hardness or density of the first head 420 may be larger than those of the second head 430 in order to reduce the wear. Flexibility of the second head 430 may be larger than those of the first head 420 in order to simulate user experience on chalk board eraser. The density and hardness of the conductor 410 may be the smallest among the three in order to reduce weight.

In the embodiment as shown in FIG. 4, the conductor 410 may occupy inner portions of the first or the second opens in addition to the internal space of the body 200 in order to fix the conductor 410 inside the body 200. One or more fastening elements may be disposed on internal surface of inner portions of the first or the second opens for fixing the conductor 410.

Since the line 431 is longer than the line 421 or the second head 430 is chunkier than the first head 420. Under same pressure, the contact surface between the second head 430 and the touch screen or panel 120 is larger than the contact surface between the first head 420 and the touch screen or panel 120. For the touch sensitive processing apparatus 110, it may determine which one of the first head 420 or the second head 430 touches the touch screen or panel 120 based on the area size of the contact surface. When the touch sensitive processing apparatus 110 determines that the first head 420 touches, it may notify the host 140 to switch into the input mode and to shrink the corresponding display content. When the touch sensitive processing apparatus 110 determines that the second head 430 touches, it may notify the host 140 to switch into the eraser mode and to enlarge the corresponding display content. The styli provided in following embodiments are characterized in the similar fashion such that the touch sensitive processing apparatus 110 is able to determine which ends of the styli approaches or touches the touch screen or panel 120.

Figure 5:
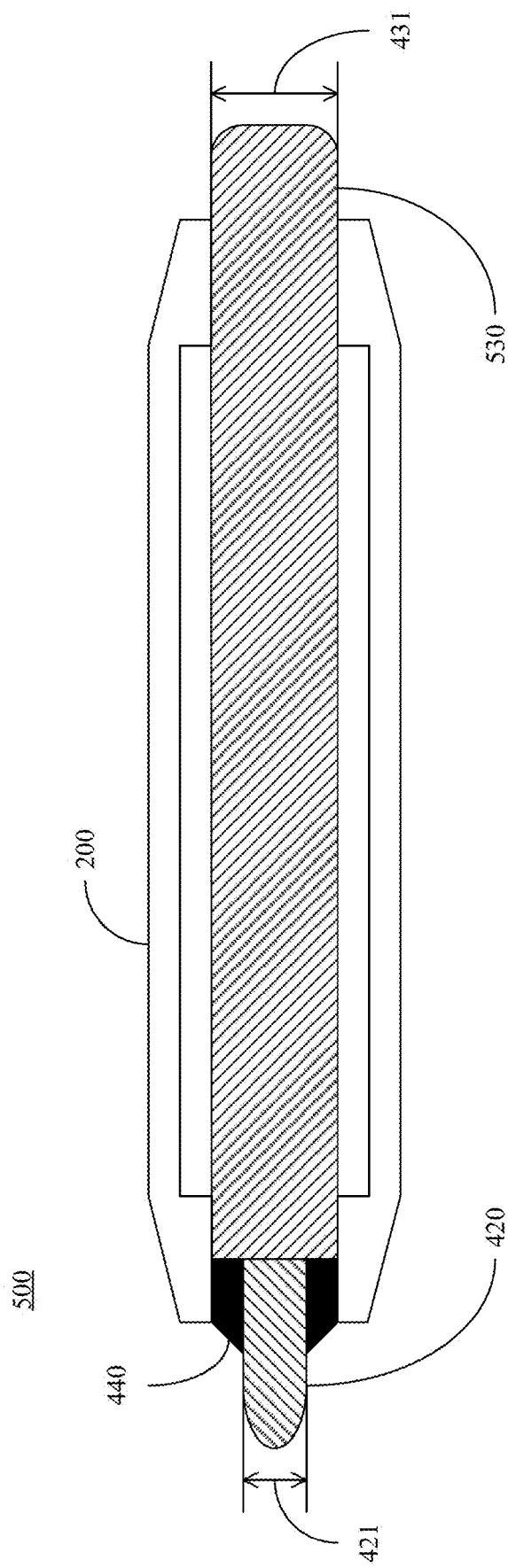
FIG. 5 illustrates a cross sectional view of a stylus 500 according to an embodiment of the present application.

Please refer to FIG. 5, which illustrates a cross-sectional view of a stylus 500 in accordance with an embodiment of the present application. Comparing with the stylus 400 as shown in FIG. 4, the conductor 410 and the second head 430 are combined as a uniformed second head 530. A most part of the second head 530 is inside the internal space of the body 200. The second head 530 is in contact with the first head 420 and they are electrically coupled. In order to increase the user experience, the first head 420 and the second head 530 may be made of different materials. For example, hardness or density of the first head 420 may be larger than those of the second head 530 in order to reduce wear and tear. Flexibility of the second head 530 may be larger than those of the first head 420 in order to simulate user experience on the chalk board eraser.

In the embodiment as shown in FIG. 5, the second head 530 occupies the second open and a portion of the first open to be fixed inside the body 200. In the embodiment, the stylus 500 can comprise one or more fastening elements inside the first open and/or the second open in order to fix the second head 530 inside the body 200. In an alternative embodiment, the internal surface of the body may include built-in fastening elements to fix the second head 530 inside the body 200.

Figure 6:
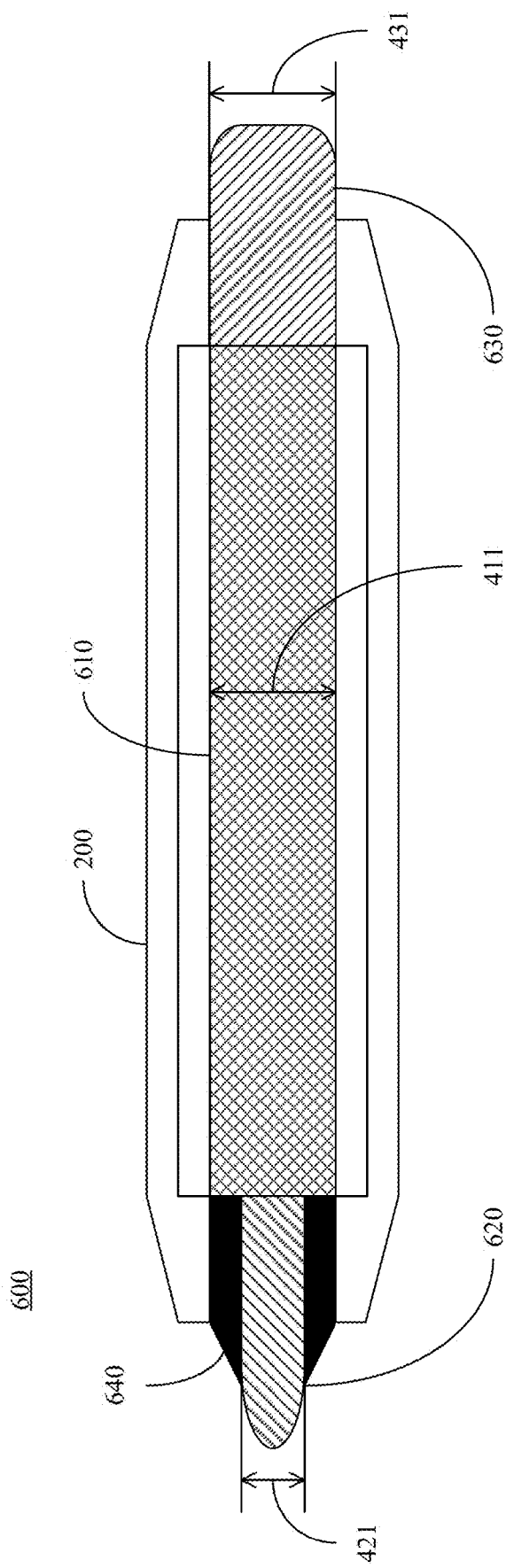
FIG. 6 illustrates a cross sectional view of a stylus 600 according to an embodiment of the present application.

Please refer to FIG. 6, which illustrates a cross-sectional view of a stylus 600 in accordance with an embodiment of the present application. Comparing with the stylus 400 as shown in FIG. 4, the conductor 610 does not occupy any portions of the first and the second opens but the internal space inside the body 200. The conductor 610 may be fixed by the connections to the first head 620 and the second head 630. Because the contact areas provided by one or more fastening elements between the first head 620 and the first open of the body 200 are larger than those of the first head 420, the contact areas between the second head 630 and the second open of the body 200 are larger than those of the second head 430, it is more solid to fix the first head 620 and the second head 630 to the first open and the second open, respectively. Consequently, relying on the connections to the first head 620 and the second head 630, the conductor 610 can be fixed inside the body 200 better.

In the embodiment, it is not necessary to fix the conductor 610. It is only required to have electrical couplings between the conductor 610 with the first head 620 and the second head 630, respectively. Because the stylus 600 may be impacted or fallen quite frequently, the joints between the conductor 610 and the heads may be broken, wear or teared. The stylus 600 as shown in FIG. 6 does not require the conductor 610 to be fixed or not.

Figure 7:
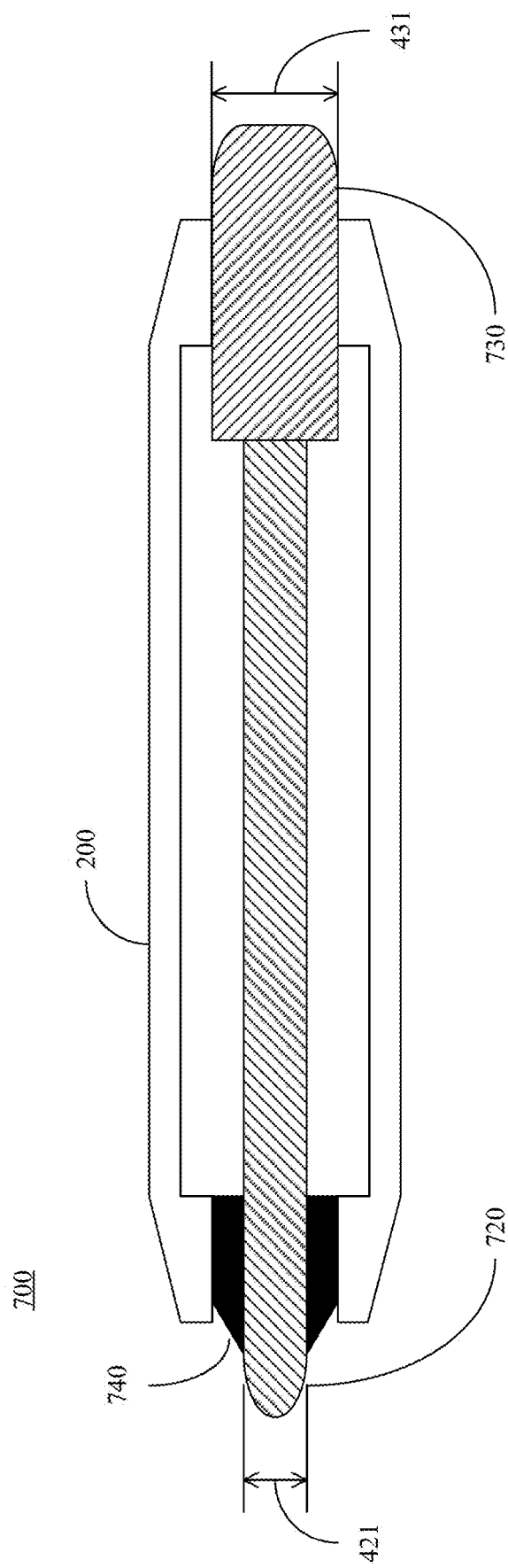
FIG. 7 illustrates a cross sectional view of a stylus 700 according to an embodiment of the present application.

Please refer to FIG. 7, which illustrates a cross-sectional view of a stylus 700 in accordance with an embodiment of the present application. Comparing with the stylus 400 as shown in FIG. 4, the conductor 510 and the first head 420 are merged into a uniformed first head 720. A large portion of the first head 720 is inside the internal space of the body 200. The second head 730 is in contact with the first head 720 to be electrical coupled. In order to increase the users' experience, the first head 720 and the second head 730 may be made of different materials. For examples, the hardness or the density of the first head 720 may be larger than those of the second head 730 in order to reduce wear and tear. The flexibility of the second head 730 may be larger than those of the first head 720 in order to simulate the chalk board eraser.

In the embodiment as shown in FIG. 7, because the volume of the first head 720 is less than those of the conductor 410, the weight of the stylus 700 is further reduced. Because the first head 720 is longer than the first head 420, one or more fastening elements of the stylus 700 are also longer. Thus, they can fix the first head 720 better.

Figure 8:
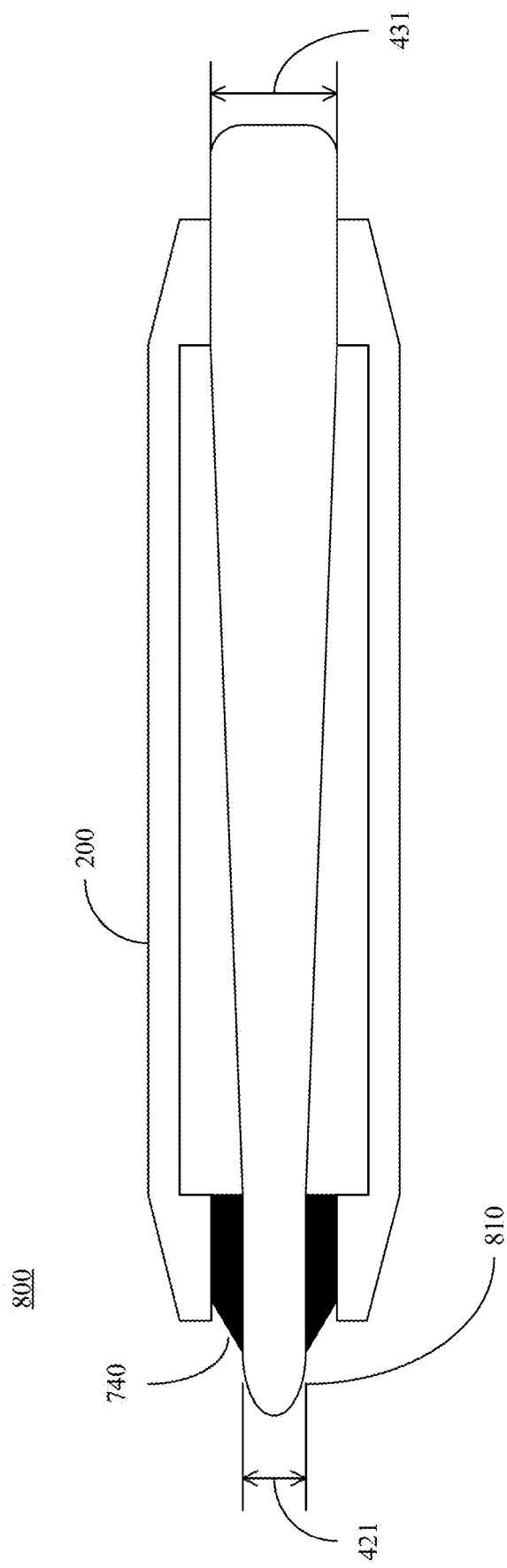
FIG. 8 illustrates a cross sectional view of a stylus 800 according to an embodiment of the present application.

Please refer to FIG. 8, which illustrates a cross-sectional view of a stylus 800 in accordance with an embodiment of the present application. Comparing with the stylus 400 as shown in FIG. 4, the conductor 410, the first head 420 and the second head 430 have combined into a uniformed conductor 810. Because the second end of the conductor 810 is bigger than the first end, the sizes of the cross-sectional areas inside the internal space of the body 200 are varied.

Since the stylus 800 has only one uniformed conductor 810, it can endure larger impacts or higher falls. Besides, the volume of the conductor 810 inside the internal space is smaller than those of the conductor 410, the weight of the stylus 800 can be reduced further.

Figure 9:
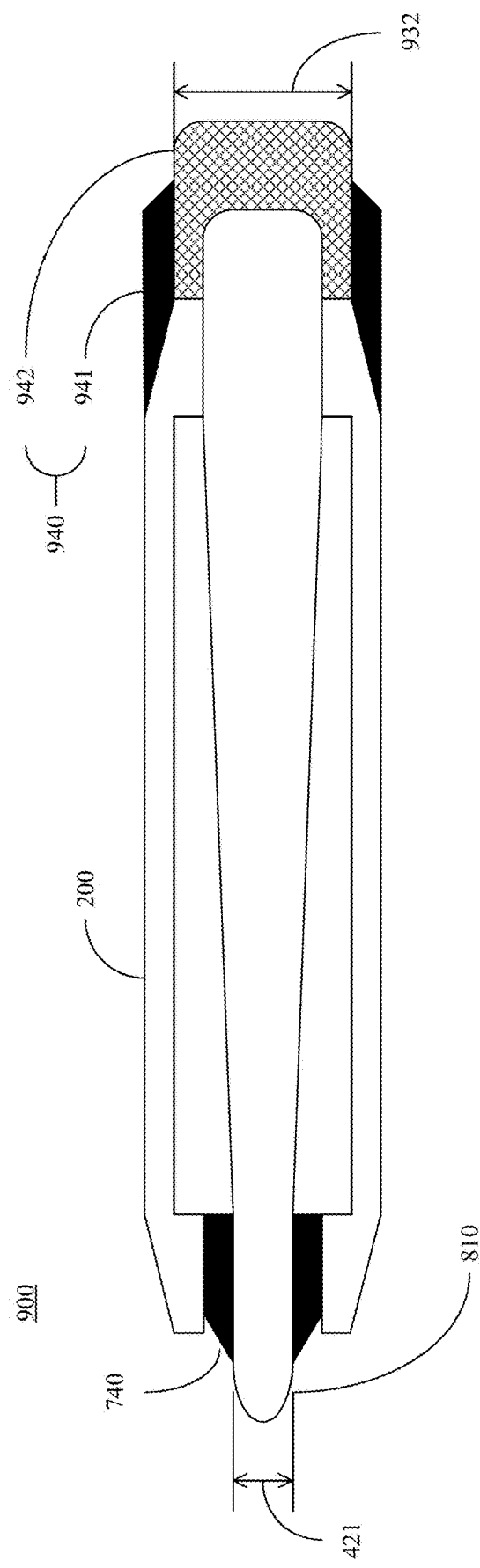
FIG. 9 illustrates a cross sectional view of a stylus 900 according to an embodiment of the present application.

Please refer to FIG. 9, which illustrates a cross-sectional view of a stylus 900 in accordance with an embodiment of the present application. Comparing with the stylus 800 as shown in FIG. 8, the stylus 900 further includes an additional eraser cap 940. Although the eraser cap 940 is applied to the conductor 810 of the stylus 800 as shown in FIG. 8, the eraser cap 940 is able to be applied to the second heads in the previous embodiments.

The eraser cap 940 may include conductive third head 942, which is configured to couple to the second head or the conductor 810 protruding the second open electrically. In the consequence, the user can have a larger contact size between the third head 942 and the touch screen or panel 120. It is easier for the touch sensitive processing apparatus 110 to tell which one of the first head or the eraser cap of the stylus 900 is in contact with the touch screen or panel 120. A diameter or a longest line 932 passing through the center of the perpendicular cross-section of the third head 942 is larger than the line 431, but smaller than the line 240.

The eraser cap 940 may further include one or more third head fastening elements 941 which are configured to connect the third head 942 or the body 200. The one or more third head fastening elements 914 may be made of conductive materials or non-conductive materials. The present application does not limit the materials of the one or more third-head fastening elements 941.

Figure 10:
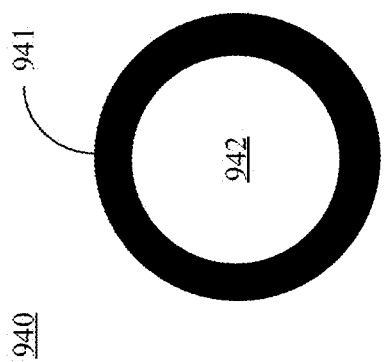
FIG. 10 illustrates a diagram of an eraser cap 940 according to an embodiment of the present application.

Please refer to FIG. 10, which illustrates a diagram of an eraser cap 940 in accordance with an embodiment of the present application. The view as shown in FIG. 10 is from the right side of the stylus 900 as shown in FIG. 9. The third head 942 is in the middle. And the third head fastening elements 941 are arranged around the third head 942.

Figure 11:
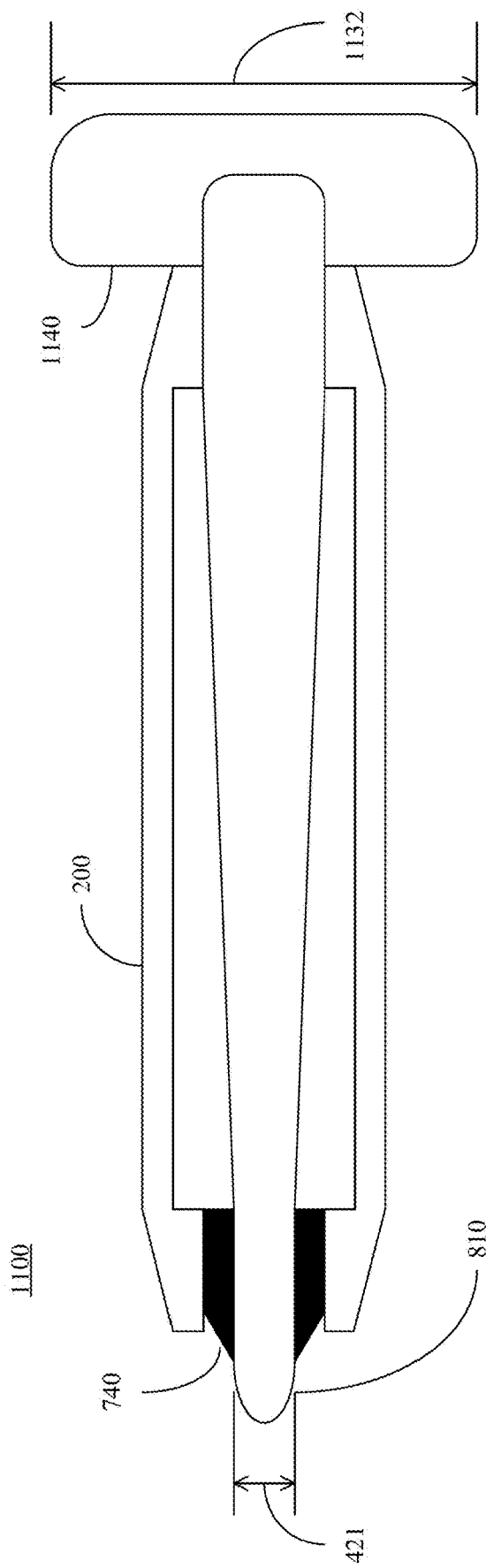
FIG. 11 illustrates a cross sectional view of a stylus 1100 according to an embodiment of the present application.

Please refer to FIG. 11, which illustrates a cross-sectional view of a stylus 1100 in accordance with an embodiment of the present application. Comparing with the stylus 800 as shown in FIG. 8, the stylus 1100 further includes an additional eraser cap 1140. Although the eraser cap 1140 is applied to the conductor 810 of the stylus 800 as shown in FIG. 8, the eraser cap 1140 is able to be applied to the second heads in the previous embodiments.

The eraser cap 1140 may include conductive material, which is configured to couple to the second head or the conductor 810 protruding the second open electrically. In the consequence, the user can have a larger contact size between the eraser cap 1140 and the touch screen or panel 120. It is easier for the touch sensitive processing apparatus 110 to tell which one of the first head or the eraser cap of the stylus 1100 is in contact with the touch screen or panel 120. A diameter or a longest line 1132 passing through the center of the perpendicular cross-section of the eraser cap 1140 is larger than the line 240.

According to one embodiment of the present application, a passive capacitive stylus is provided. The stylus comprising: a body, made of non-conductive material, comprises an internal space, wherein two ends of the body comprises a first open and a second open, respectively, a longest first line inside the first open perpendicular to a central axis of the body is shorter than a longest space line inside the internal space perpendicular to the central axis, a longest second line inside the second open perpendicular to the central axis of the body is shorter than the longest space line; a conductor, disposed inside the internal space, comprises conductive foam; a first head made of conductive material and disposed inside the first open and being protruded outside the body in a first direction of the central axis, the first head is in contact with the conductor; and a second head made of conductive material and disposed inside the second open and being protruded outside the body in a second direction of the central axis, the second head is in contact with the conductor.

In order to make the touch sensitive processing apparatus easier to tell which ends of the stylus is in contact with the touch screen or panel, the capacitive stylus further comprises an eraser cap which encapsulates and connects to the second head protruded outside the body, the eraser cap comprises conductive material, and the eraser cap is electrically coupled with the second head.

In order to fix the eraser cap to the body more solid, the eraser cap further comprises a third head made of conductive material and configured to encapsulate and connect to the second head protruded outside the body; and one or more third head fastening elements configured to fix the third head to the body.

In order to let the user have a larger contact area to erase, one longest eraser cap line of the eraser cap perpendicular to the central axis is larger than one longest body line of the body perpendicular to the central axis.

In order to reduce the weight of the stylus, especially to reduce the volume of the conductor, the conductor further comprises a packing form for encapsulating the conductive foam so as that the portion of the conductor inside the internal space is not in contact with the body.

In order to let the conductor installed inside the body and steadily connected to the first and the second heads, the conductor occupies a portion of the first open and a portion of the second open, the conductive foam encapsulates a part of the first head and a part of the second head.

In order to reduce number of parts, to simplify manufacture process, and to enhance the electrically coupling, the stylus is further configured as one of following: the conductor, the first head, and the second head are made in a uniform; the conductor and the first head are made in a uniform; and the conductor and the second head are made in a uniform.

In order to fix the slender first head inside the first open, wherein the first line is shorter than the second line, there exists one or more fastening elements inside the first open for fixing the first head inside the first open.

In order to increase the users' different experiences on two ends of the stylus, the hardness of the first head is larger than the hardness of the second head, the flexibility of the second head is larger than the flexibility of the first head, the hardness of the conductive foam is smaller than those of the first and the second heads.

According to an embodiment of the present application, the eraser cap is provided.

According to an embodiment of the present application, an eraser cap for connecting with a passive capacitive stylus is provided. The capacitive stylus further comprises a body, a first head, and a conductor, wherein the body, made of non-conductive material, comprises an internal space, wherein two ends of the body comprises a first open and a second open, respectively, wherein the conductor, disposed inside the internal space, comprises conductive foam, wherein the first head made of conductive material and disposed inside the first open and being protruded outside the body in a first direction of a central axis of the body, the first head is in contact with the conductor, wherein the second head made of conductive material and disposed inside the second open and being protruded outside the body in a second direction of the central axis, the second head is in contact with the conductor, wherein the eraser cap encapsulates and connects to the second head protruded outside the body, the eraser cap comprises conductive material, and the eraser cap is electrically coupled with the second head.

Preferably, in order to fix the eraser cap to the body more solid, the eraser cap further comprises: a third head made of conductive material and configured to encapsulate and connect to the second head protruded outside the body; and one or more third head fastening elements configured to fix the third head to the body.

Preferably, in order to let the user have a larger contact area to erase, one longest eraser cap line of the eraser cap perpendicular to the central axis is larger than one longest body line of the body perpendicular to the central axis.

According to the passive capacitive stylus provided by the present application, it can improve users' experience. It is not required to have additional switch procedures to provide input and erase functions to users conveniently. For example, the input accuracy can be increased, the erasing area can be enlarged. Moreover, the manufacture cost and the weight can be decreased. And it has better fall protection.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A passive capacitive stylus, comprising:
   a body, made of non-conductive material, comprises an internal space, wherein two ends of the body comprises a first open and a second open, respectively, a longest first line inside the first open perpendicular to a central axis of the body is shorter than a longest space line inside the internal space perpendicular to the central axis, a longest second line inside the second open perpendicular to the central axis of the body is shorter than the longest space line;
   a conductor disposed inside the internal space, wherein the conductor comprises conductive foam;
   a first head made of conductive material and disposed inside the first open and being protruded outside the body in a first direction of the central axis, the first head is in contact with the conductor; and
   a second head made of conductive material and disposed inside the second open and being protruded outside the body in a second direction of the central axis, the second head is in contact with the conductor.

2. The passive capacitive stylus of claim 1, further comprises an eraser cap which encapsulates and connects to the second head protruded outside the body, the eraser cap comprises conductive material, and the eraser cap is electrically coupled with the second head.

3. The passive capacitive stylus of claim 2, wherein the eraser cap further comprises:
   a third head made of conductive material and configured to encapsulate and connect to the second head protruded outside the body; and
   one or more third head fastening elements configured to fix the third head to the body.

4. The passive capacitive stylus of claim 2, wherein one longest eraser cap line of the eraser cap perpendicular to the central axis is larger than one longest body line of the body perpendicular to the central axis.

5. The passive capacitive stylus of claim 1, wherein the conductor further comprises a packing form for encapsulating the conductive foam so as that the portion of the conductor inside the internal space is not in contact with the body.

6. The passive capacitive stylus of claim 1, wherein the conductor occupies a portion of the first open and a portion of the second open, wherein the conductive foam encapsulates a part of the first head and a part of the second head.

7. The passive capacitive stylus of claim 1, wherein the stylus is further configured as one of following:
   the conductor, the first head, and the second head are made in a uniform;
   the conductor and the first head are made in a uniform; and
   the conductor and the second head are made in a uniform.

8. The passive capacitive stylus of claim 1, wherein the first line is shorter than the second line, there exists one or more fastening elements inside the first open for fixing the first head inside the first open.

9. The passive capacitive stylus of claim 1, wherein the hardness of the first head is larger than the hardness of the second head, the flexibility of the second head is larger than the flexibility of the first head, the hardness of the conductive foam is smaller than those of the first and the second heads.

10. An eraser cap for connecting with a passive capacitive stylus, wherein the capacitive stylus further comprises a body, a first head, a second head, and a conductor, wherein the body, made of non-conductive material, comprises an internal space, wherein two ends of the body comprises a first open and a second open, respectively, wherein the conductor, disposed inside the internal space, comprises conductive foam, wherein the first head made of conductive material and disposed inside the first open and being protruded outside the body in a first direction of a central axis of the body, the first head is in contact with the conductor, wherein the second head made of conductive material and disposed inside the second open and being protruded outside the body in a second direction of the central axis, the second head is in contact with the conductor, wherein the eraser cap encapsulates and connects to the second head protruded outside the body, the eraser cap comprises conductive material, and the eraser cap is electrically coupled with the second head.

11. The eraser cap as claimed in claim 10, further comprises:
 a third head made of conductive material and configured to encapsulate and connect to the second head protruded outside the body; and
 one or more third head fastening elements configured to fix the third head to the body.

12. The eraser cap as claimed in claim 10, wherein one longest eraser cap line of the eraser cap perpendicular to the central axis is larger than one longest body line of the body perpendicular to the central axis.

* * * * *